United States Patent
Ishiyama

(10) Patent No.: US 10,235,593 B2
(45) Date of Patent: Mar. 19, 2019

(54) IDENTIFICATION METHOD, IDENTIFICATION SYSTEM, IDENTIFICATION APPARATUS, AND PROGRAM

(71) Applicant: NEC Corporation, Minato-ku, Tokyo (JP)

(72) Inventor: Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/774,436

(22) PCT Filed: Mar. 11, 2014

(86) PCT No.: PCT/JP2014/056266
§ 371 (c)(1),
(2) Date: Sep. 10, 2015

(87) PCT Pub. No.: WO2014/142099
PCT Pub. Date: Sep. 18, 2014

(65) Prior Publication Data
US 2016/0042245 A1    Feb. 11, 2016

(30) Foreign Application Priority Data
Mar. 12, 2013 (JP) .................. 2013-049282

(51) Int. Cl.
| | | |
|---|---|---|
| G06K 9/00 | (2006.01) | |
| G06K 9/46 | (2006.01) | |
| G06K 9/62 | (2006.01) | |
| G07D 7/202 | (2016.01) | |

(52) U.S. Cl.
CPC ....... *G06K 9/4609* (2013.01); *G06K 9/00577* (2013.01); *G06K 9/4652* (2013.01); *G06K 9/6267* (2013.01); *G07D 7/202* (2017.05)

(58) Field of Classification Search
CPC .. G06K 9/4609; G06K 9/6267; G06K 9/4652; G06K 9/00577; G07D 7/2025
See application file for complete search history.

(56) References Cited

U.S. PATENT DOCUMENTS

| | | | |
|---|---|---|---|
| 6,263,086 B1 | 7/2001 | Wang | |
| 7,065,228 B2* | 6/2006 | Brundage | B29C 45/14688 264/297.2 |
| 7,095,874 B2* | 8/2006 | Moskowitz | G06T 1/0028 382/100 |
| 8,323,780 B1* | 12/2012 | Simske | B41M 3/14 283/85 |

(Continued)

FOREIGN PATENT DOCUMENTS

| | | |
|---|---|---|
| CN | 101152822 A | 4/2008 |
| CN | 102037676 A | 4/2011 |

(Continued)

OTHER PUBLICATIONS

International Search Report for PCT Application No. PCT/JP2014/056266, dated Jun. 3, 2014.

(Continued)

*Primary Examiner* — John B Strege

(57) ABSTRACT

The present invention is an identification method comprising: with at least a part of a skeleton part of an identification mark attached to a component or a product defined as a matching area, identifying the component, product, or product having the component as one of its constituent elements using a textured pattern formed in the matching area.

19 Claims, 12 Drawing Sheets

(56) References Cited

U.S. PATENT DOCUMENTS

| | | | |
|---|---|---|---|
| 2002/0175446 A1* | 11/2002 | Friery | B29C 45/4407 |
| | | | 264/328.1 |
| 2006/0034483 A1* | 2/2006 | Au | G06T 1/0028 |
| | | | 382/100 |
| 2008/0081213 A1 | 4/2008 | Ito et al. | |
| 2008/0219503 A1 | 9/2008 | Di Venuto et al. | |
| 2009/0080760 A1* | 3/2009 | Knysh | G06K 9/00577 |
| | | | 382/141 |
| 2011/0096955 A1 | 4/2011 | Voloshynovskiy et al. | |
| 2012/0008827 A1 | 1/2012 | Rueth et al. | |
| 2014/0205153 A1* | 7/2014 | Sharma | G06K 9/00577 |
| | | | 382/109 |
| 2018/0082157 A1 | 3/2018 | Ishiyama | |

FOREIGN PATENT DOCUMENTS

| | | |
|---|---|---|
| DE | 102009016289 A1 | 7/2010 |
| JP | 2001014462 A | 1/2001 |
| JP | 2003138486 A | 5/2003 |
| JP | 2005129016 A | 5/2005 |
| JP | 2008009539 A | 1/2008 |
| JP | 2008098949 A | 4/2008 |
| JP | 2008133495 A | 6/2008 |
| JP | 2012043953 A | 3/2012 |
| WO | 2013/018614 A1 | 2/2013 |
| WO | 2013/018615 A1 | 2/2013 |

OTHER PUBLICATIONS

Extended European Search Report for EP Application No. EP14765768.8 dated Oct. 28, 2016.
Chinese Office Action for CN Application No. 201480020475.5 dated Jan. 12, 2017.
Japanese Office Action for JP Application No. 2015-505481 dated May 9, 2018 with English Translation.

* cited by examiner

EXTRACT IMAGE FEATURE OF TEXTURE FORMED IN MATCHING AREA

LARGER BLACK REGION FOR GREATER Θ, RESULTING IN LARGER PORTION OF TEXTURE IMAGED IN BLACK

SMALLER BLACK REGION FOR SMALLER Θ, RESULTING IN SMALLER PORTION OF TEXTURE IMAGED IN BLACK

FIG. 8

| MOLD | IMAGE FEATURE | MANAGEMENT INFORMATION |
|---|---|---|
| MOLD 1 | XXX | 100 |
| MOLD 2 | YYY | 200 |
| ... | ... | ... |
| MOLD N | ZZZ | 1000 |

FIG. 10

| LOGO PLATE ID | IMAGE FEATURE | MANAGEMENT INFORMATION |
|---|---|---|
| LOGO PLATE 1 | XXX | 100 |
| LOGO PLATE 2 | YYY | 200 |

| ... | ... | ... |

| LOGO PLATE N | ZZZ | 1000 |

FIG. 12

| LOGO PLATE ID | IMAGE FEATURES OF LOGO PLATE | | MANAGEMENT INFORMATION |
| --- | --- | --- | --- |
| | MOLD DIFFERENCE IMAGE FEATURE | INDIVIDUAL OBJECT DIFFERENCE IMAGE FEATURE | |
| LOGO PLATE 1 | MOLD A AAA | XXX | 100 |
| LOGO PLATE 2 | | YYY | 101 |
| ... | | ... | ... |
| LOGO PLATE N | | ZZZ | 150 |
| LOGO PLATE 111 | MOLD B BBB | XYY | 200 |
| LOGO PLATE 112 | | XYZ | 201 |
| ... | | ... | ... |
| LOGO PLATE 11N | | ZZZ | 1000 |
| ... | ... | ... | |

IDENTIFICATION METHOD, IDENTIFICATION SYSTEM, IDENTIFICATION APPARATUS, AND PROGRAM

This application is a National Stage Entry of PCT/JP2014/056266 filed on Mar. 11, 2014, which claims priority from Japanese Patent Application 2013-049282 filed on Mar. 12, 2013, the contents of all of which are incorporated herein by reference, in their entirety.

TECHNICAL FIELD

The present invention relates to an identification method, an identification system, an identification apparatus, and a program.

BACKGROUND ART

Recently, there has been an increasing need to match/identify components and/or products based on a mold or a lot, or based on an individual object for quality control and distribution management.

Therefore, RFIDs for data communication by a wireless communication technique are incorporated into the components and/or products to achieve general merchandise management beginning from production of the components and/or products down to physical distribution, sale or the like, and prevention of misplacement, theft, counterfeit or the like of the components and/or products as merchandise.

For example, a technique disclosed in Patent literature 1 involves attaching an RFID chip to an article. By such a configuration, data stored in a memory in the RFID chip may be used to perform matching for merchandise distribution management, manufacture history management, evaluation of genuineness, and/or the like.

Moreover, in Patent literature 2, there is proposed invention comprising forming microscopic bumps and dips in a predetermined area in a surface of a merchandise product without any special apparatus such as an RFID chip attached, and applying matching to the bumps and dips to achieve evaluation of genuineness of the merchandise product.

CITATION LIST

Patent Literature

[PATENT LITERATURE 1]
Japanese Unexamined Patent Application Publication No. 2008-9539
[PATENT LITERATURE 2]
Japanese Unexamined Patent Application Publication No. 2008-133495

SUMMARY OF INVENTION

Technical Problem

The technique according to Patent literature 1, however, poses a problem that it is significantly expensive because each and every product to be managed should be attached with an RFID chip. Moreover, small articles such as buttons, rivets, fastening parts and so forth cannot be attached with even an ordinary tag, not to mention the special apparatus such as an RFID chip.

Moreover, from the recent advance of technology such as merchandise design and metal processing, there is a tendency toward preference for smooth surfaces of merchandise such as components or products, particularly, of metal portions or the like. Therefore, when bumps and dips for identification are formed on a surface of a merchandise product as in the technique according to Patent literature 2, there arises a problem that design of the merchandise such as components and/or products is degraded.

Furthermore, in the technique according to Patent literature 2, the bumps and dips for identification are microscopic, which poses a problem that it is difficult to determine which portion to image as a matching area for matching by merely relying on the bumps and dips for identification.

Thus, the present invention has been made in view of the problems described above, and its objective is to provide an identification method, an identification system, an identification apparatus, and a program with which any special apparatus, such as an IC tag, is not required, and a matching area can be easily located to allow identification of components and/or products without degrading the design of the components and/or products.

Solution to Problem

The present invention is an identification method comprising: with at least a part of a skeleton part of an identification mark attached to a component or a product defined as a matching area, identifying said component, product, or product having said component as one of its constituent elements using a textured pattern formed in said matching area.

The present invention is an identification system comprising: an image feature storage unit in which, with at least a part of a skeleton part of an identification mark attached to a component or a product defined as a matching area, an image feature of a textured pattern formed in said matching area is stored; and an identification unit configured to match an image feature of a textured pattern formed in a matching area in a skeleton part of an identification mark attached to a component or a product to be identified, or in a skeleton part of a component that is one of constituent elements of a product to be identified, with an image feature stored in said image feature storage unit, and identify said component, product, or product having said component as one of its constituent elements to be identified.

The present invention is a matching apparatus comprising: an acquisition unit configured to, with at least a part of a skeleton part of an identification mark attached to a component or a product defined as a matching area, acquire a first image of a textured pattern formed in said matching area, and a second image of a textured pattern formed in a matching area in a skeleton part of an identification mark attached to a component or a product to be identified, or in a skeleton part of a component that is one of constituent elements of a product to be identified; and an output unit configured to match said first image with said second image, and output a result of matching.

The present invention is a registration apparatus comprising: a textured pattern forming unit configured to apply textured finish generating microscopic random bumps and dips to at least a part of a skeleton part of an identification mark attached to a component or a product, and form a textured pattern for matching; an imaging unit configured to, with at least a part of a skeleton part formed with a textured pattern defined as a matching area, image a textured pattern in a matching area in a skeleton part of said component or said product under predetermined imaging conditions; and a registration unit configured to register in a storage unit identification information for identifying said component or said product in correspondence with an image feature of said imaged textured pattern in a matching area.

The present invention is a program for causing a computer to execute: acquisition processing of, with at least a part of a skeleton part of an identification mark attached to a component or a product defined as a matching area, acquiring a first image of a textured pattern formed in said matching area, and a second image of a textured pattern formed in a matching area in a skeleton part of an identification mark attached to a component or a product to be identified, or in a skeleton part of a component that is one of constituent elements of a product to be identified; and matching processing of matching said first image with said second image, and outputting a result of matching.

The present invention is a component or a product formed in at least a part of a skeleton part of its identification mark with a textured pattern for matching for identifying said component or product.

Advantageous Effect of Invention

The present invention requires no special apparatus, such as an IC tag, and is capable of easily locating a matching area to identify components and/or products without degrading the design of the components and/or products.

BRIEF DESCRIPTION OF DRAWINGS

FIG. 8 is a diagram showing an exemplary image feature database 103.
FIG. 10 is a diagram showing an exemplary image feature database 203.
FIG. 12 is a diagram showing an exemplary image feature database 303.

DESCRIPTION OF EMBODIMENTS

The present invention is characterized in comprising, with at least a part of a skeleton part of an identification mark attached to a component or a product defined as a matching area, identifying the component, the product, or a product having the component as one of its constituent elements using a textured pattern formed in the matching area. Now terminology used in the present embodiments will be explained.

The term component refers to those produced by manufacturers and includes, for example, a logo plate and an emblem serving as an identification mark for products and/or manufacturers, as well as those generally incorporating therein an identification mark. For example, they include fastening components (rivets, slider zippers, hook-and-loop fasteners, snap fasteners, rail zippers, buckles, cord stoppers, belt adjusters, swivel clasps, snap buttons, buttons or the like), bolts, nails, packages or housings of semiconductor chips, plastic components, and mechanical components including gears, frames, bearings, and wheels (for automobiles, bicycles or the like). Moreover, the component as used herein is not necessarily integrally/constantly fixed to another component or a product, and it may include those for temporal sealing or fixing, such as containers (cans, caps, battery cases or the like), seals, and labels (metal clips or the like).

The term product refers to those produced by manufacturers and purchased by consumers, and includes, for example, apparel products such as bags and clothes, watches, jewelry, leather goods, processed metal products (building materials such as window frames, keys, tools such as wrenches and socket wrenches, watches, golf clubs or the like), wooden products, and industrial products (for example, semiconductor chips, electronic devices or the like incorporating them).

The term product having a component as one of its constituent elements refers to a product attached with the aforementioned component. For example, it includes a bag (product) attached with a logo plate or a fastening component (component).

The term identification mark refers to characters, figures, symbols, three-dimensional shapes, or a combination of thereof, or a combination thereof with colors, which are attached for identifying a component or a product. Examples of the identification mark include a trademark, a logo, the name of a manufacturer, the name of a manufacturing company, the name of a brand, the name of a product, a serial number, and a lot number.

Figure 1:
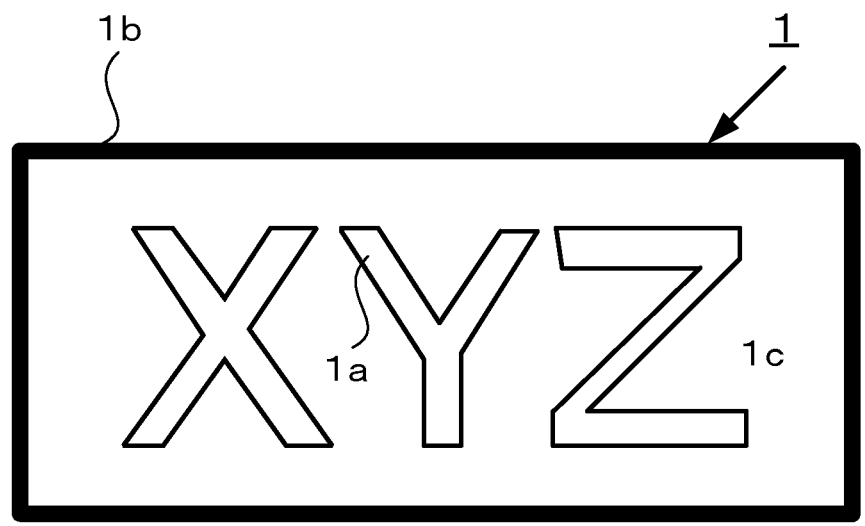
FIG. 1 is a diagram for explaining a skeleton part of an identification mark.

The term skeleton part of an identification mark refers to the portion of the main shape of the identification mark that can serve as an object perceived by human senses for identifying the identification mark, and is sometimes called colored portion or foreground portion. For example, assuming that there is an identification mark 1 as shown in FIG. 1, the identification mark 1 is comprised of a character portion 1a of "XYZ", a frame line portion 1b enclosing the character portion 1a of "XYZ", and a planar portion 1c. Out of these portions, the portion that can serve as the object perceived by human senses for identifying the identification mark, i.e., the skeleton part of the identification mark 1, is the character portion 1a of "XYZ" and the frame line portion 1b. It should be noted that the skeleton part is not necessarily three-dimensional having physical bumps or dips relative to portions other than the skeleton part, for example, to a texture (textile) portion, and it may be planar, similar to the other portions.

The term matching area refers to at least a part of a skeleton part of an identification mark. In other words, it means that the whole skeleton part or only a part of the skeleton part may be defined as the matching area. In the example in FIG. 1, the character portion 1a and frame line portion 1b, for example, may be the matching area, or only the character portion 1a or frame line portion 1b may be the matching area. Furthermore, only a part of the character portion 1a or frame line portion 1b may be the matching area.

The term textured pattern formed in a matching area in a skeleton part of an identification mark includes a textured pattern formed as a design of the skeleton part of the identification mark, and in addition, a textured pattern deliberately formed in the matching area in the skeleton part of the identification mark for identifying a component or a product. It further includes a case in which a textured pattern only in the matching area is used even when the textured pattern is formed all over the skeleton part of the identification mark.

Now specific embodiments will be described hereinbelow.

First Embodiment

A first embodiment of the present invention will be described.

Figure 2:
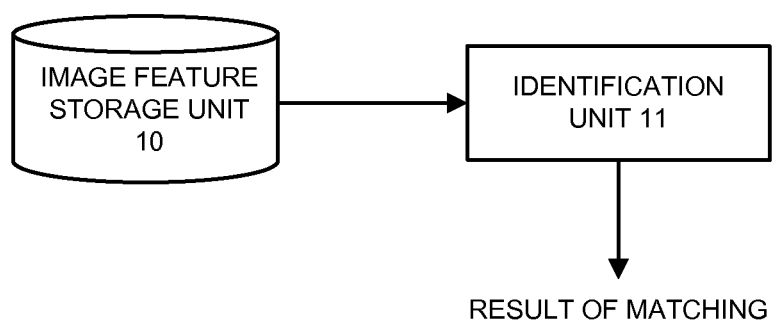
FIG. 2 is a block diagram of a first embodiment.

FIG. 2 is a block diagram of the first embodiment of the present invention.

An identification system in the first embodiment of the present invention comprises: an image feature storage unit 10 in which, with at least a part of a skeleton part of an identification mark attached to a component or a product defined as a matching area, an image feature of a textured pattern formed in the matching area is stored; and an identification unit 11 for matching an image feature of a textured pattern formed in a matching area in a skeleton part of an identification mark attached to a component or a product to be identified, or in a skeleton part of a component that is one of constituent elements of a product to be identified, with an image feature stored in the image feature storage unit 10, and identifying the component, product, or product having the component as one of its constituent elements to be identified.

Figure 3:
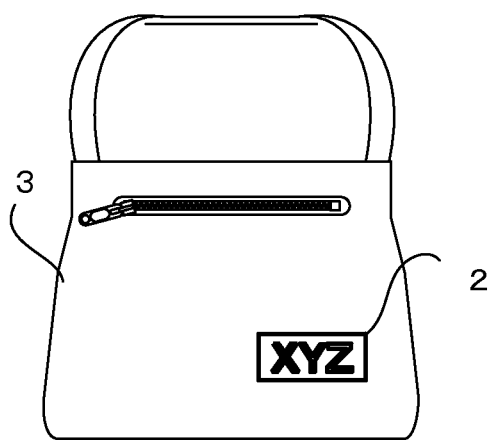
FIG. 3 is a diagram for explaining the first embodiment.
Figure 4:
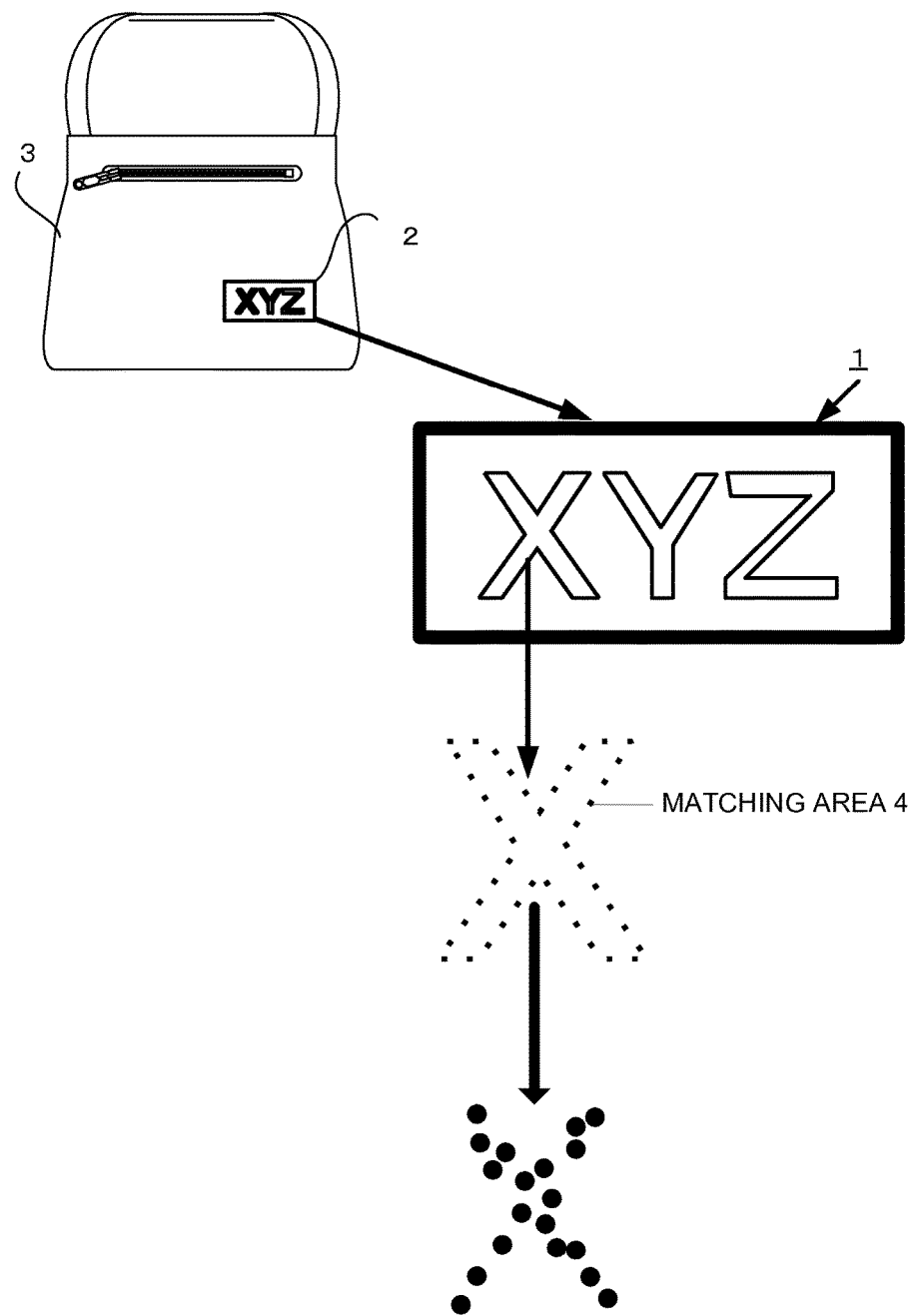
FIG. 4 is a diagram for explaining the first embodiment.

The following description will address a case in which the component is a logo plate 2, and a bag 3 having the logo plate 2 as one of its constituent elements, i.e., bag 3 attached with the logo plate 2, is to be identified, as shown in FIG. 3. As such, assume that the portion of a character "X" within a skeleton part of an identification mark 1 of the logo plate 2 is defined as a matching area 4, in which area a textured pattern is formed, as shown in FIG. 4. The matching area 4, however, may be defined in a part of the character "X", rather than the whole character "X".

As such, possible processing methods for making the textured pattern formed in the skeleton part of the identification mark may be generally classified into two types.

One of the types is a processing method involving applying a textured pattern to a mold for fabricating a component and/or a product by injection molding or casting. The textured finish for a mold may be achieved by using various techniques including etching and blasting. Common techniques merely allow control of granularity or the like of the textured surface without accurately reproducing the position and size of each and every microscopic bump and dip, and a random pattern is generated at each run of processing. Therefore, in the case that a plurality of molds are prepared for fabricating the same article, microscopic bumps and dips in the textured finished region in each mold are different from mold to mold. Obviously, when producing fake products, it is possible to imitate the same mold at a glance; however, it is difficult to completely copy each and every microscopic bump and dip of the textured pattern. According to the processing method, all individual objects produced from the same mold may be given a generally identical textured pattern. On the contrary, different molds have different microscopic features of their textured patterns. In such processing, at least one of a group of individual objects (group of articles) produced using a certain mold is chosen, and an image feature of the textured pattern in the matching area 4 of the individual object is registered in the image feature storage unit 10 as a representative value for use as a standard for identification. According to the method, a component or a product having an image feature with a predetermined degree of similarity or higher to a registered image feature may be identified as a component or a product formed with the textured pattern by that mold, which provides an advantage that a group of individual objects (group of components or group of products) produced from a particular mold may be matched using a smaller amount of registered data. Moreover, since textured finish applied to a mold with which an identification mark is generated is less expensive and the cost is not proportional to the number of manufactured products, the method is advantageous in its cost.

While the description above addresses a case in which at least one of a group of individual objects (group of articles) produced using a certain mold is chosen, and an image feature of the textured pattern in the matching area 4 of the individual object is registered in the image feature storage unit 10 as a representative value for use as a standard for identification, the present invention is not limited thereto. For example, an image of a mold in its textured portion (the portion for applying textured processing to a component or the like) may be acquired for registration in the image feature storage unit 10. In this case, the bumps-and-dips pattern of the textured pattern in the component or the like formed by application of textured processing by the mold is a reverse pattern having reversed bumps and dips with respect to the bumps-and-dips pattern of the textured pattern of the mold. Therefore, the image of the textured pattern of the mold (the portion for applying textured processing to a component or the like) to be registered in the image feature storage unit 10 is an image (image feature) with its brightness values reversed. Thus, the image of the textured pattern in the matching area 4 of an individual object of the component or the like may be used without modification during matching.

Alternatively, the image of the textured pattern of the mold (the portion for applying textured processing to a component or the like) to be registered in the image feature storage unit 10 may be registered as is without reversing its brightness value, and the brightness value of the image of the textured pattern in the matching area 4 of an individual object of the component or the like may be reversed during matching.

Methods of the other type include textured processing by a process of generating a microscopic random bumps-and-dips pattern for each individual object, such as etching, blasting, cutting, crystal/powder coating, dispersion plating, or generation of microscopic planar bumps and dips by plating or coating. By such processing, the formed textured pattern is different from individual object to individual object. Accordingly, an image feature of the textured pattern formed in a matching area is registered for each individual object (for each component or product) in the image feature storage unit 10. The method may provide an advantage that matching (identification) may be achieved for each individual object of a component or a product because the textured pattern is different from individual object to individual object (from component to component or from product to product).

Moreover, the two types of methods described above may be combined to further apply the coating or plating described above to the portion undergoing textured processing by a mold, whereby differentiation in microscopic bumps and dips between individual objects may be facilitated to further improve identifiability. At that time, differences in feature from individual object to individual object are additionally provided by further finishing while preserving differences in feature from mold to mold as they are, so that identification based on the mold and that based on the individual object are both enabled. In particular, the dimensions of bumps and dips in textured finish applied to the mold may be coarser than later textured finish, thereby achieving greater differences between molds than differences between individual objects. Thus, a lower threshold of the degree of similarity of the feature quantity in matching (in identification) may be set during identification of each mold than during identification of each individual object, enabling matching using a smaller amount of registered data, as described above. Furthermore, this advantage may be positively used to achieve hierarchical identification processing involving first performing identification based on a mold to reduce the number of data to be matched, and then, performing identification of an individual object, which enables reduction of the load of identification processing.

Next, imaging of the textured pattern in the matching area, extraction of the image feature of the textured pattern in the matching area, and registration into the image feature storage unit 10 will be described; according to the present embodiment, the portion of the character "X" is defined as the matching area 4, and the image feature of the textured pattern formed in the matching area 4 is extracted beforehand for storing in the image feature storage unit 10. In mold-based textured processing, several samples of the logo plate 2 undergoing textured processing by the mold are chosen, and the textured pattern in the matching area 4 of the samples of the logo plate 2 is imaged by an imaging apparatus, or the textured pattern of the mold (the portion for applying textured processing to a component or the like) is imaged by the imaging apparatus. Moreover, in the textured processing by finishing, the textured pattern of each logo plate 2 in the matching area 4 is imaged by the imaging apparatus. An image feature is extracted from the imaged textured pattern and is registered in the image feature storage unit 10. The extraction of an image feature from a captured image may be achieved by performing extraction using an extraction technique for image features of fingerprints, such as the brightness value of the image, feature points, and points of inflection, intersecting points, end points and center points of lines in a binarized image.

In registering the image feature of the logo plate 2 in the image feature storage unit 10, management information for the bag 3 having the logo plate 2 as one of its constituent elements is registered in correspondence with the image feature of the logo plate 2. By doing so, the bag 3 is identifiable insofar as the logo plate 2 is identifiable.

Now the image feature of the textured pattern for identification will be described; even the same component or product may have different image features depending upon illumination conditions in imaging the textured pattern formed in the component or product. This is because the textured pattern is composed of microfine bumps and dips, and the positions of shadows generated by the bumps and dips vary depending upon the direction of light illumination, resulting in different image features. Therefore, it is preferable to image the textured pattern registered in the image feature storage unit 10 and the textured pattern of the skeleton part of the component or product to be identified under similar illumination conditions.

Thus, it is preferable to use an imaging support device and an imaging apparatus for imaging, for example, the textured pattern formed in the matching area in the skeleton part of a component or a product. Now exemplary imaging support device and imaging apparatus for use in the present embodiment will be described.

Figure 5:
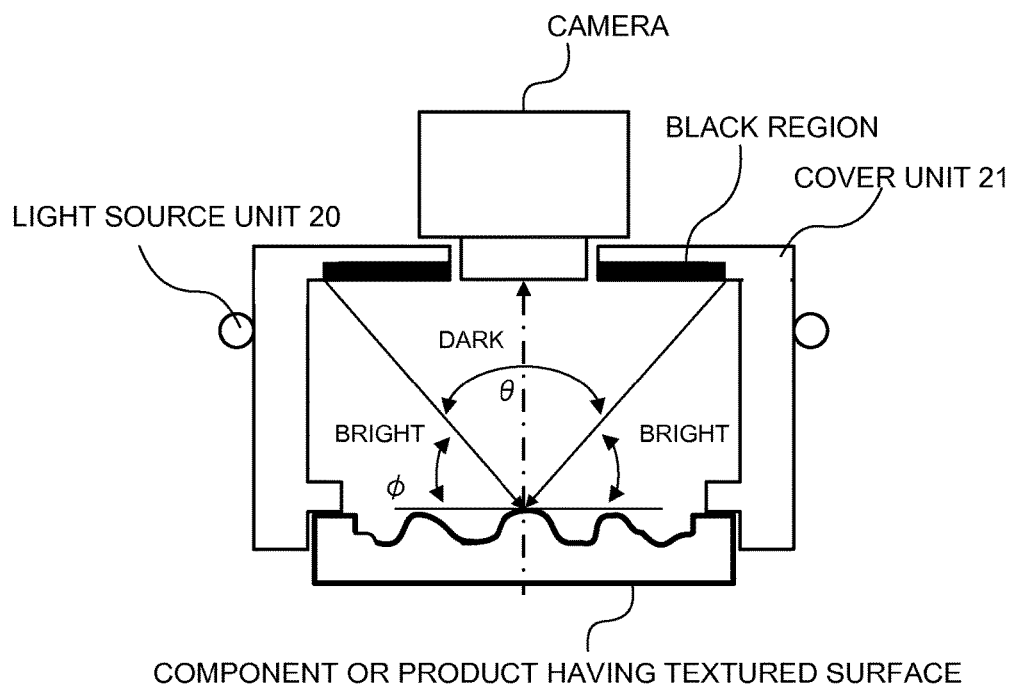
FIG. 5 is a diagram for explaining an imaging support device and an imaging apparatus for use in the first embodiment.

FIG. 5 is a diagram for explaining an imaging support device and an imaging apparatus for use in the present embodiment. The imaging support device in the present embodiment is for aiding in imaging of a surface of an object having microscopic bumps and dips with strong specular reflection, for example, a textured surface with a textured pattern in the matching area, and the device comprises a light source unit 20 for emitting light, and a cover unit 21 having a shape to cover a predetermined region in a surface of a component or a product, and consisting of a part of its surface falling within a predetermined angular range with respect to a normal direction directly opposite to the aforementioned predetermined region colored in black for absorbing light, and the other part of its surface falling within the other angular range serving as the light source unit 20 or a light source region plane diffusively radiating light emitted by the light source unit 20.

The cover unit 21 is formed in parallel, for example, with the textured surface, and is provided with an imaging aperture for imaging in the normal direction of the textured surface, where the cover unit 21 comprises an upper surface portion having a region facing the textured surface colored in black, and a side wall portion provided perpendicular to the upper surface portion and constructed from a member for diffusing light from the light source unit 20.

The black region of the cover unit 21 is defined by an angular range $\theta$ for a dark region and an angular range $\varphi$ for a bright region with respect to the normal of a plane (for example, a peak plane of a bump lying at the center of the matching area) in the matching area of the textured surface of the component or product. As such, the distribution of the black plane and diffusive plane is specified only by the range of the angle with respect to the normal direction of the textured surface, and the shape and angle of the plane are arbitrary. That is, while the plane of the diffusive member is described as being perpendicular to the black plane merely by way of example, the shape and positioning angle thereof are arbitrary. Likewise, the black plane is not necessarily even a plane, and it may have any arbitrary shape insofar as the plane covers the whole range of the angle $\theta$ from the normal of the textured surface.

Figure 6:
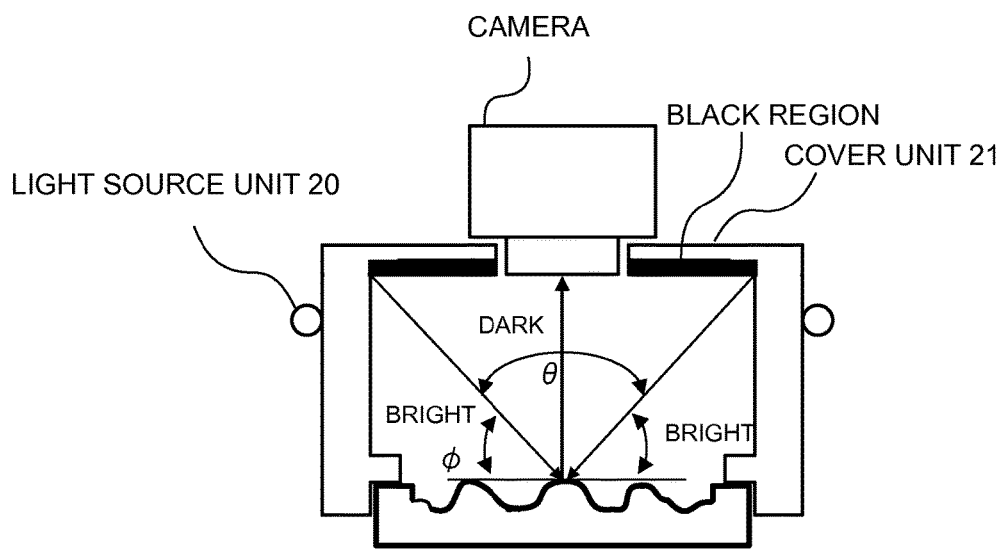
FIG. 6 is a diagram for explaining the imaging support device and imaging apparatus for use in the first embodiment.
Figure 6:
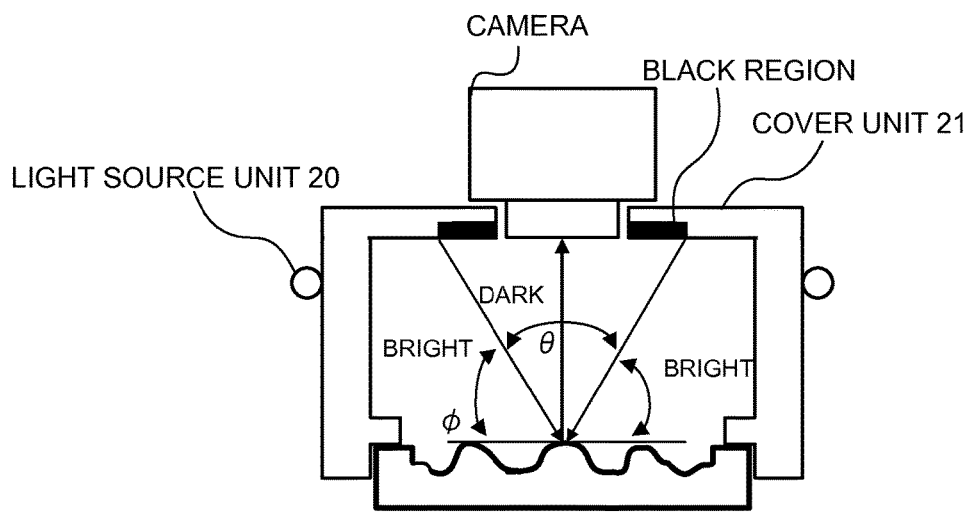

Since the black region of the cover unit 21 does not reflect illuminated light from the light source unit 20, the peak portion of the bumps of the textured surface directly opposite to the camera mounted in the imaging aperture through the upper surface appears in black. There is a relationship between the size of the black region of the cover unit 21 and the angular range $\theta$ of the dark region, as shown in FIG. 6, such that a greater angular range $\theta$ set for the black and dark region results in a larger black region of the cover unit 21, while a smaller angular range $\theta$ set for the dark region results in a smaller black region of the cover unit 21. The larger black region of the cover unit 21 in turn results in a larger portion of the textured surface appearing in black, while the smaller black region results in a smaller portion of the textured surface appearing in black. According to the present embodiment, the angular ranges $\theta$ and/or $\varphi$ are adjusted so that the number of the black pixels in the matching area in the image capturing the textured surface or the degree of separation of the brightness value of pixels in the matching region has a prespecified value (for example, 25% or the like). Particularly, the size of the black region of the cover unit 21 may be changed, or the height of the side wall of the cover unit 21 may be changed. Various methods are available for this purpose, and an exemplary method comprises providing a screw mechanism for vertically moving the black region, and rotating the screw mechanism to thereby adjust the height of the side wall of the cover unit 21. This is provided merely by way of example and other methods may be employed.

The actual dimensions of the textured bumps and dips vary with parameters in finishing on the component or product to be identified, and therefore, the distribution of brightness in the captured image is optimized by adjusting the angular ranges θ, φ to provide the black region having an appropriate size. It should be noted that the threshold for binarization is defined by using the brightness value with which the primary differential in a histogram of brightness variation is maximized.

Thus, the peak portion of bumps of the textured surface having the normal in a direction directly opposite to the camera is imaged in black, while dips of the textured surface that are not directly opposite thereto are imaged in white because of light reflected in various directions, so that a captured image can be obtained in which contrast between brightness and darkness for dips and bumps is enhanced, thus facilitating stable extraction of the peaks as feature points.

Moreover, when extracting an image feature of a textured pattern in the matching area from a captured image of the textured pattern in the matching area, it is preferable to extract the image feature of the textured pattern in the matching area after normalizing the captured image of the textured pattern in the matching area. Since at least a part of a skeleton part of an identification mark attached to a component or a product is defined as a matching area according to the present embodiment, the skeleton part of the identification mark may be defined as a reference site. In the case of FIG. 4, for example, the portion of the character "X" within the skeleton part of the identification mark 1 of the logo plate 2 is defined as the matching area 4 (the inside of the dotted line). As such, since the character "X" within the skeleton part is a part of the identification mark 1 and has a common shape and size among all samples of the logo plate 2, the character "X" may be defined as a reference site. The features of the character "X" serving as the reference site may then be stored, thus facilitating identification of the position/posture of the character "X" in the captured image. Therefore, by normalizing and identifying the position/posture of the character "X", the position/posture of the character "X" in the matching area 4 may be normalized and specified for extracting the image feature of the textured pattern formed in the matching area 4. While a case in which the character "X" within the skeleton part is defined as the reference site is described in the present embodiment, the present invention is not limited thereto, and other parts of the skeleton part, such as any other character or the surrounding frame line portion 1b, for example, may be defined as the reference site.

As described above, the identification unit 11 normalizes a captured image of the textured pattern formed in the matching area 4 at the character "X" in the logo plate 2 to be identified that is captured under predetermined imaging conditions, and extracts an image feature. The extracted image feature for the logo plate 2 to be identified is then matched with an image feature stored in the image feature storage unit 10 to thereby identify the logo plate 2. When the logo plate 2 can be identified, the bag 3 can also be identified from management information corresponding to the image feature of the logo plate 2.

Effects of the present embodiment described above are as follows:

(1) since the textured pattern for identifying a component or a product is formed in the skeleton part of the identification mark, the textured pattern is perceived by human eyes as a colored region, thus inhibiting the design or the like of the identification mark;

(2) since the matching area is placed within the skeleton part of the identification mark and the identification mark is ordinarily recognized by anyone, it is easy, in identifying a component or a product, to determine which portion to image for identifying the component or product; and (3) in extracting an image feature of the texture, the skeleton part of the identification mark may be defined as a reference site, which enables easy normalization of the captured image. This is because the skeleton part of the identification mark serving as the reference site in components or products of the same kind is given the same pattern in common, independent of individual objects.

Second Embodiment

A second embodiment will be described.

The second embodiment is directed to an identification system for a bag using a logo plate, in which an example of the component is the logo plate, and a textured pattern is formed in a matching area in a skeleton part of an identification mark in the logo plate by a mold.

Figure 7:
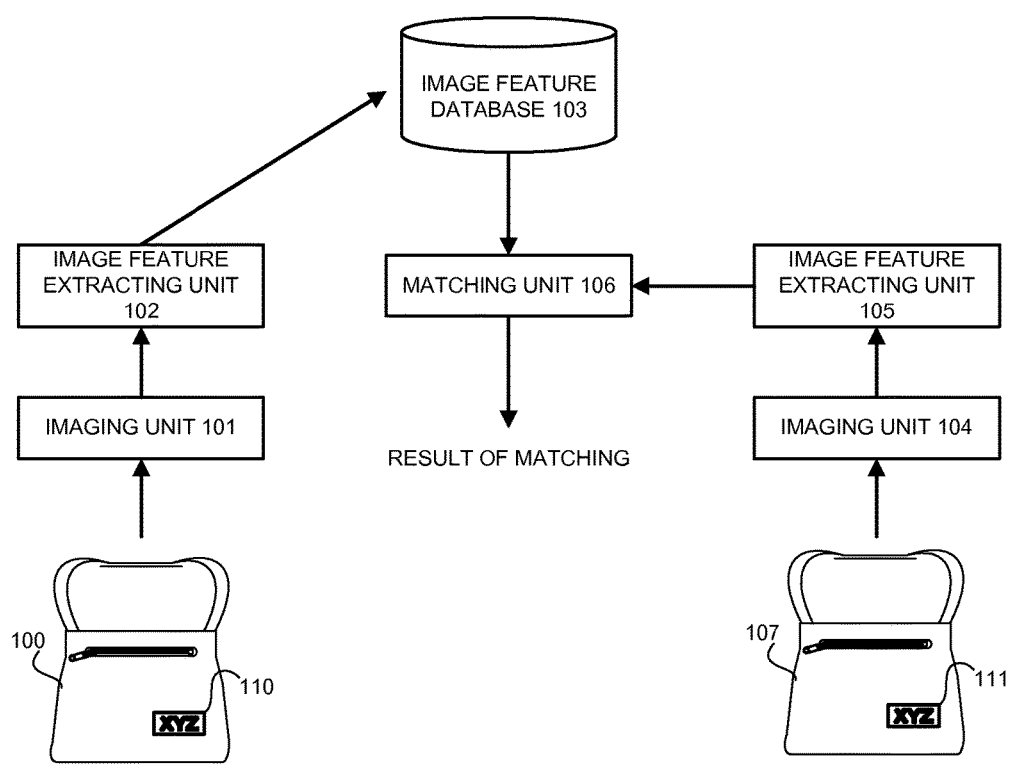
FIG. 7 is a block diagram of a second embodiment.

FIG. 7 is a configuration diagram of an identification system for a bag.

An imaging unit 101 exists in a party engaged in production of a bag 100 (a manufacturer or the like of the bag) or a party engaged in quality control of the bag 100, for imaging a matching area in a skeleton part of an identification mark in a logo plate 110 attached to the bag 100 by a manufacturer or the like. The imaging unit 101 is for performing imaging under the predetermined imaging conditions as described above. As for the number of samples to be imaged, since generally the same textured pattern is formed for each mold in the case of the mold-based textured processing, several samples of the logo plate may be chosen for each mold, and the chosen samples of the logo plate may be imaged. Moreover, the file type of the captured image is arbitrary, and may be JPEG or the like.

An image feature extracting unit 102 is for extracting an image feature of a textured pattern in the matching area from the image captured at the imaging unit 101. The extraction of the image feature is achieved by, as described above, normalizing the image captured at the imaging unit 101 using the skeleton part of the identification mark, and then performing extraction using an extraction technique for image features of fingerprints, such as the brightness value of the image, feature points, and points of inflection, intersecting points, end points and center points of lines in a binarized image. The thus-extracted image features are registered in an image feature database 103.

The image feature database 103 stores therein a mold, an image feature of the textured pattern in the matching area of the logo plate 110 processed by the mold, and management information for the bag 100 attached with the logo plate 110 in correspondence with one another, as shown in FIG. 8. It should be noted that the management information refers to a concept encompassing identification information for a component or a product, or a product attached with the component, and in addition, management information for the component or product such as production information including the place of manufacture, product line, and date and time of production for the component or product, and distribution information including the name of the product in which the component is used, delivery destination, date of delivery, and the like.

As such, by making an image feature of a textured pattern in a component in correspondence with management information for the component or product, or product attached with the component, it is possible to achieve acquisition of historical information on the identified logo plate 110 (component), and identification of the bag 100 (a product having the component as one of its constituent elements) attached with the logo plate 110 as well.

The imaging unit 104 and image feature extracting unit 105 exist in a party that performs matching/identification of a bag, such as an inspection department for the bag, a delivery destination for the bag, and a dealer or a purchaser of the bag, and the units 104, 105 have similar configurations to those of the imaging unit 101 and image feature extracting unit 102.

The matching unit 106 matches an image feature in a matching area of a logo plate 111 in a bag 107 to be matched that is extracted at the image feature extracting unit 105 with an image feature stored in the image feature database 103, and in the case that there is found a matched entry, it decides that the logo plate 111 in the bag 107 to be matched is an authorized logo plate registered in the image feature database 103. For example, when an image feature of the logo plate 111 is "YYY", the logo plate 111 may be identified as that processed by the mold 2. The bag 107 attached with the logo plate 111 may be then identified as that with management information "100".

An image feature matching method may comprise, for example, defining end points, intersecting points, and corners of lines in the textured pattern as feature points, matching the positions of the feature points, and deciding identity in the case that the number of pairs of feature points lying at the same position (within a certain threshold range) is a certain number or more. Such a matching technique may be achieved by employing any existing fingerprint matching technique.

It should be noted that the imaging unit, image feature extracting unit, image feature database, and matching unit described above each may stand alone and be connected with one another via a network, or several ones among them may be integrally present.

As described above, according to the present embodiment, an individual object of a component or a product, or a mold used in manufacture of the component or product may be subjected to matching relying upon a textured pattern formed in a skeleton part of an identification mark while eliminating the need for any special apparatus such as a tag for identifying an article or an RFID tag, and at the same time, without degrading the design of the identification mark such as a trademark or a logo. In particular, according to this second embodiment, generally the same textured pattern is formed for each mold because of mold-based textured processing, which is useful when mold-based matching is performed, for example, in mold-based quality inspection. Moreover, it enables decision of a fake product because fake products and the like are produced using a different mold from that for authorized products.

Third Embodiment

A third embodiment will be described.

The third embodiment is directed to an identification system for a bag using a logo plate, in which an example of the article is the logo plate, and a textured pattern is individually formed in a matching area in a skeleton part of an identification mark in a logo plate zipper by blasting.

Figure 9:
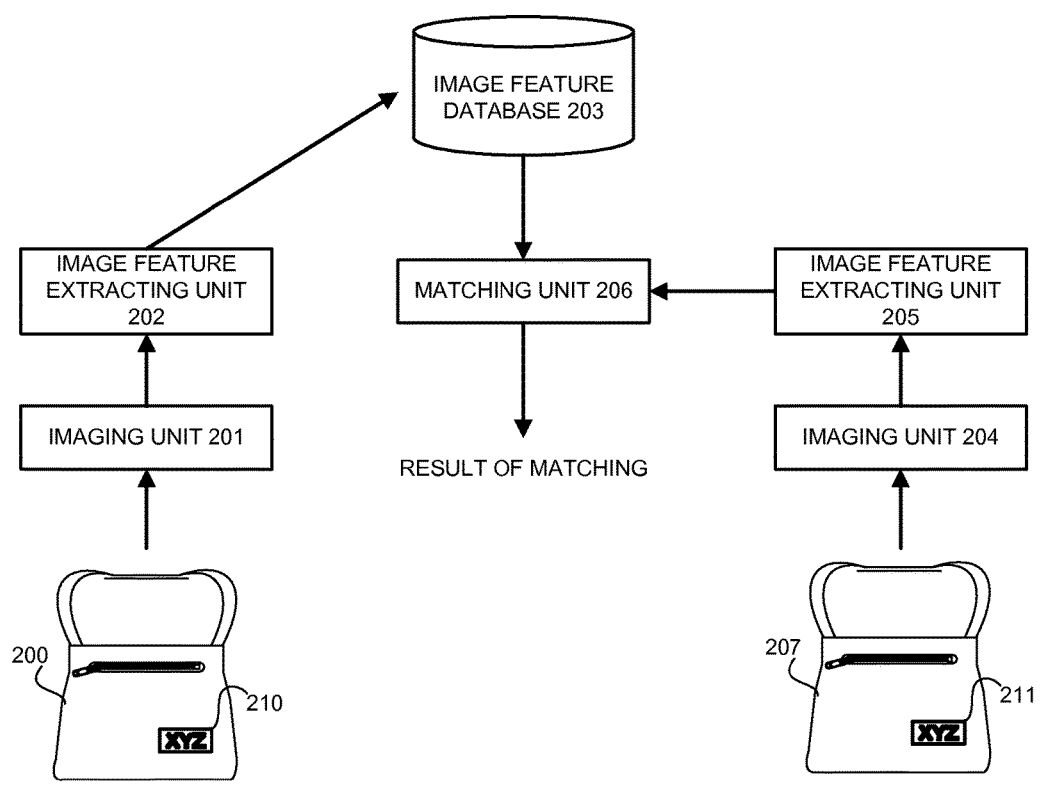
FIG. 9 is a block diagram of a third embodiment.

FIG. 9 is a configuration diagram of a matching system for a zipper.

An imaging unit 201 exists in a party engaged in production of a bag 200 (a manufacturer or the like of the bag) or a party engaged in quality control of the bag 200, for imaging a matching area in a skeleton part of an identification mark in a logo plate 210 attached to the bag 200 by a manufacturer or the like. In addition, the imaging unit 201 is for performing imaging under the predetermined imaging conditions described above. Moreover, the file type of the captured image is arbitrary, and may be JPEG or the like.

An image feature extracting unit 202 is for extracting an image feature of a textured pattern in the matching area from the image captured at the imaging unit 201. The extraction of the image feature is achieved by, as described above, normalizing the image captured at the imaging unit 201 using the skeleton part of the identification mark, and then performing extraction using an extraction technique for image features of fingerprints, such as the brightness value of the image, feature points, and points of inflection, intersecting points, end points and center points of lines in a binarized image. The thus-extracted image features are registered in an image feature database 203.

The image feature database 203 stores therein individual object identification information for identifying an individual object of the logo plate 210, an image feature of the textured pattern in the matching area of the logo plate 210, and management information for the bag 200 attached with the logo plate 210 in correspondence with one another, as shown in FIG. 10. The individual object identification information for the logo plate 210 may include management information for the component or product such as production information including the place of manufacture, product line, and date and time of production for the component or product, and distribution information including the name of the product in which the component is used, delivery destination, date of delivery, and the like. Moreover, the management information for the bag 200 refers to a concept encompassing identification information for a component or a product, or a product attached with the component, and in addition, management information for the component or product such as production information including the place of manufacture, product line, and date and time of production for the component or product, and distribution information including the name of the product in which the component is used, delivery destination, date of delivery, and the like.

As such, by making an image feature of a textured pattern in a component in correspondence with management information for the component or product, or product attached with the component, it is possible to achieve acquisition of historical information on the identified logo plate 210 (component), and identification of the bag 200 (a product having the component as one of its constituent elements) attached with the logo plate 210 as well.

The imaging unit 204 and image feature extracting unit 205 exist in a party that performs matching/identification of a bag, such as an inspection department for the bag, and a delivery destination for the bag, including a dealer or a purchaser of the bag, and the units 204, 205 have similar configurations to those of the imaging unit 201 and image feature extracting unit 202.

The matching unit 206 matches an image feature in a matching area of a logo plate 211 in a bag 207 to be matched that is extracted at the image feature extracting unit 205 with an image feature stored in the image feature database 203, and in the case that there is found a matched entry, it decides that the logo plate 211 to be matched is an authorized logo plate registered in the image feature database 203. For example, when the image feature of the logo plate 211 is "YYY", the logo plate 211 may be identified as that specified by identification information "logo plate 2". The bag 207 attached with the logo plate 211 may be then identified as that with management information "200".

An image feature matching method may comprise, for example, defining end points, intersecting points, and corners of lines in the textured pattern as feature points, matching the positions of the feature points, and deciding identity in the case that the number of pairs of feature points lying at the same position (within a certain threshold range) is a certain number or more. Such a matching technique may be achieved by employing any existing fingerprint matching technique.

It should be noted that the imaging unit, image feature extracting unit, image feature database, and matching unit described above each may stand alone and be connected with one another via a network, or several ones among them may be integrally present.

As described above, according to the present embodiment, an individual object of a component or a product, or a mold used in manufacture of the component or product may be subjected to matching relying upon a textured pattern formed in a skeleton part of an identification mark while eliminating the need for any special apparatus such as a tag for identifying an article or an RFID tag, and at the same time, without degrading the design of the identification mark such as a trademark or a logo. In particular, according to this third embodiment, since textured processing is based on finishing marks, and a textured pattern is formed differently from component to component or from product to product, matching of a component or a product may be distinguished at the level of the individual object.

Fourth Embodiment

A fourth embodiment will be described.

The fourth embodiment is directed to an identification system for a bag using a logo plate, in which an example of the article is the logo plate, and over a textured pattern for the logo plate applied by a mold, blasting, textured finish by powder coating, or plating is applied as a later finishing process.

Figure 11:
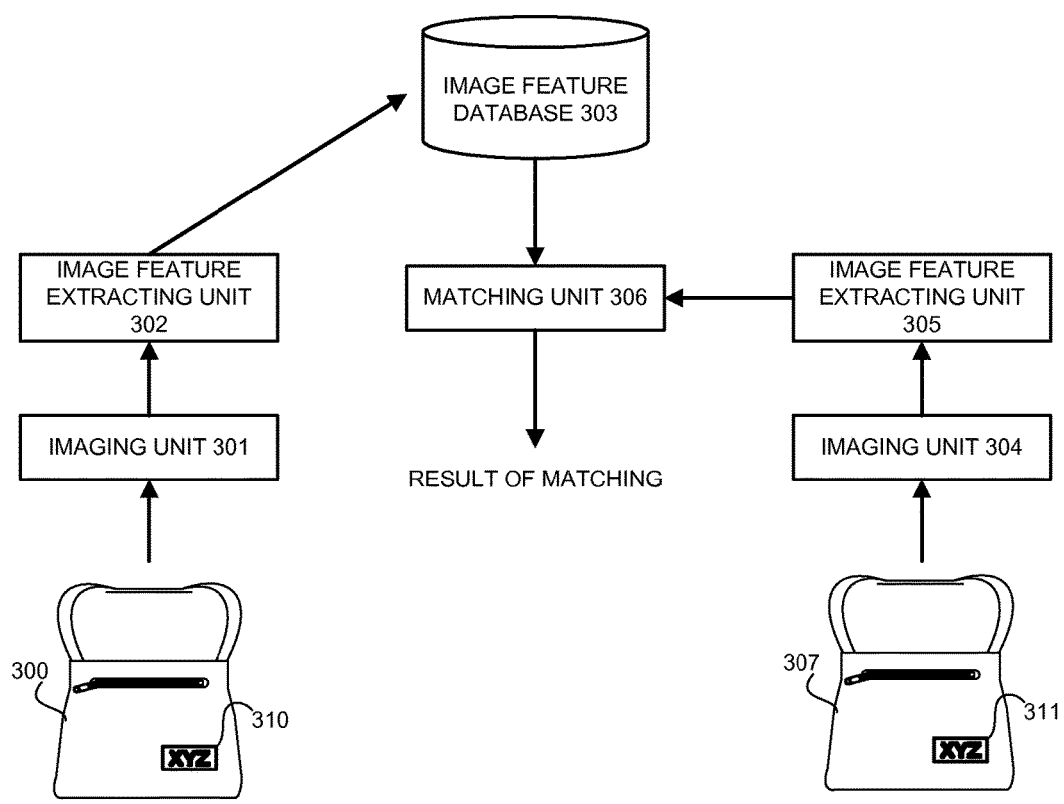
FIG. 11 is a block diagram of a fourth embodiment.

FIG. 11 is a configuration diagram of an identification system for a bag.

An imaging unit 301 exists in a party engaged in production of a bag 300 (a manufacturer or the like of the bag) or a party engaged in quality control of the bag 300, for imaging a matching area in a skeleton part of an identification mark in a logo plate 310 attached to the bag 300 by a manufacturer or the like. The imaging unit 301 is for performing imaging under the predetermined imaging conditions described above. Moreover, the file type of the captured image is arbitrary, and may be JPEG or the like.

An image feature extracting unit 302 is for extracting an image feature of a textured pattern in the matching area from the image captured at the imaging unit 301. The extraction of the image feature is achieved by, as described above, normalizing the image captured at the imaging unit 301 using the skeleton part of the identification mark, and then performing extraction using an extraction technique for image features of fingerprints, such as the brightness value of the image, feature points, and points of inflection, intersecting points, end points and center points of lines in a binarized image. The thus-extracted image features are registered in an image feature database 303.

In acquiring an image feature of the logo plate 310, the logo plate 310 has a textured pattern applied by a mold, and thereover, blasting, textured finish by powder coating, or plating is applied as a later finish process. Therefore, as described above, differences in feature from individual object to individual object are additionally provided by further finishing while preserving differences in feature from mold to mold as they are. Accordingly, it is desirable to choose several samples of the logo plate 310 for each mold, and acquire only an image feature of the textured pattern by the mold before the later finish process (which will be referred to as mold difference image feature). For other individual objects, an image feature of the textured pattern after the later finish process (individual object difference image feature) is acquired in addition to the mold-based textured pattern.

Exemplary methods for acquiring the mold difference image feature and individual object difference image feature include the following: Represent the size of each microscopic bump and dip generated by textured processing applied to a mold as a, and that of each of bumps and dips further generated by the later finish process as b. As such, assume that the texturing processes are controlled so that a>b, for example. In images of individual objects manufactured from the same mold, flecks are generated with size a mixed with those with size b. As such, only the flecks having an approximate size of a may be acquired as feature points to acquire a mold difference image feature. Moreover, the flecks with size b may be extracted to acquire an individual object difference image feature.

More stable mold matching may be achieved by extracting the mold difference feature from a plurality of samples and taking their average and the like.

The image feature database 303 stores therein individual identification information for identifying an individual object of the logo plate 310, an image feature of the textured pattern in the matching area by the mold with which the logo plate 310 is produced (mold difference image feature), an image feature of the textured pattern formed over the matching area in the logo plate 310 produced with each mold during a later finish process (individual object difference image feature), and management information for the bag 300 attached with the logo plate 310 in correspondence with one another, as shown in FIG. 12. The individual object identification information for the logo plate 310 may include management information for the component or product such as production information including the place of manufacture, product line, and date and time of production for the component or product, and distribution information including the name of the product in which the component is used, delivery destination, date of delivery, and the like. Moreover, the management information for the bag 300 refers to a concept encompassing identification information for a component or a product, or a product attached with the component, and in addition, management information for the component or product such as production information including the place of manufacture, product line, and date and time of production for the component or product, and distribution information including the name of the product in which the component is used, delivery destination, date of delivery, and the like.

As such, by making an image feature of a textured pattern in a component in correspondence with management information for the component or product, or product attached with the component, it is possible to achieve acquisition of historical information on the identified logo plate 310 (component), and identification of the bag 300 (a product having the component as one of its constituent elements) attached with the logo plate 310 as well.

The imaging unit 304 and image feature extracting unit 305 exist in a party that performs matching/identification of a bag, such as an inspection department for the bag, and a delivery destination for the bag, including a dealer or a purchaser of the bag, and the units 304, 305 have similar configurations to those of the imaging unit 301 and image feature extracting unit 302.

The matching unit 306 matches an image feature in a matching area of a logo plate 311 in a bag 307 to be identified that is extracted at the image feature extracting unit 305 with an image feature stored in the image feature database 303, and in the case that there is found a matched entry, it decides that the logo plate 311 to be identified is an authorized logo plate registered in the image feature database 303. As such, the matching unit 306 initially matches the image feature in the matching area of the logo plate 311 in the bag 307 to be identified with the image feature of the textured pattern (mold difference image feature) in the matching area by the mold to thereby distinguish a mold with which the logo plate 311 is produced. Next, it matches an individual object difference image feature of a group of zippers produced with the distinguished mold with the image feature (individual object difference image feature) of the logo plate 311 to check an individual object of the logo plate 311.

For example, in the case that an image feature of the logo plate 311 is "AAA+YYY", screening using the size of flecks or the thickness of lines, for example, can separate the image feature into the feature point AAA and the feature point YYY, as described above. Since the image feature of the logo plate 311 includes "AAA", the product may be distinguished as that produced from a mold A. Then, an image feature of a group of logo plates produced form the mold A may be matched with the image feature "AAA+YYY" of the logo plate 311 to be matched to thereby identify the logo plate 311 as a logo plate specified by identification information "logo plate 2". The bag 307 attached with the logo plate 311 may be then identified as that with management information "101".

An image feature matching method may comprise, for example, defining end points, intersecting points, and corners of lines in the textured pattern as feature points, matching the positions of the feature points, and deciding identity in the case that the number of pairs of feature points lying at the same position (within a certain threshold range) is a certain number or more. Such a matching technique may be achieved by employing any existing fingerprint matching technique.

It should be noted that the imaging unit, image feature extracting unit, image feature database, and matching unit described above each may stand alone and be connected with one another via a network, or several ones among them may be integrally present.

As described above, a characteristic point of the fourth embodiment is that, in addition to the effects in the second and third embodiments described above, it is not necessary to perform matching with all registered image features even when an individual object of a component or a product is to be identified, which achieves high-speed matching processing. Moreover, hierarchical matching may be achieved by performing merely mold-level matching for producing the component or product while eliminating the need to perform individual object-level matching of a component or a product.

Fifth Embodiment

A fifth embodiment will be described.

The fifth embodiment is a registration apparatus for: applying textured finish generating microscopic random bumps and dips to at least a part of a skeleton part of an identification mark attached to a component such as a logo plate, and forming a textured pattern for matching; with at least a part of a skeleton part formed with a textured pattern defined as a matching area, imaging a textured pattern in a matching area under predetermined imaging conditions; and registering in a database identification information for identifying the component in correspondence with an image feature of the imaged textured pattern in a matching area.

Figure 13:
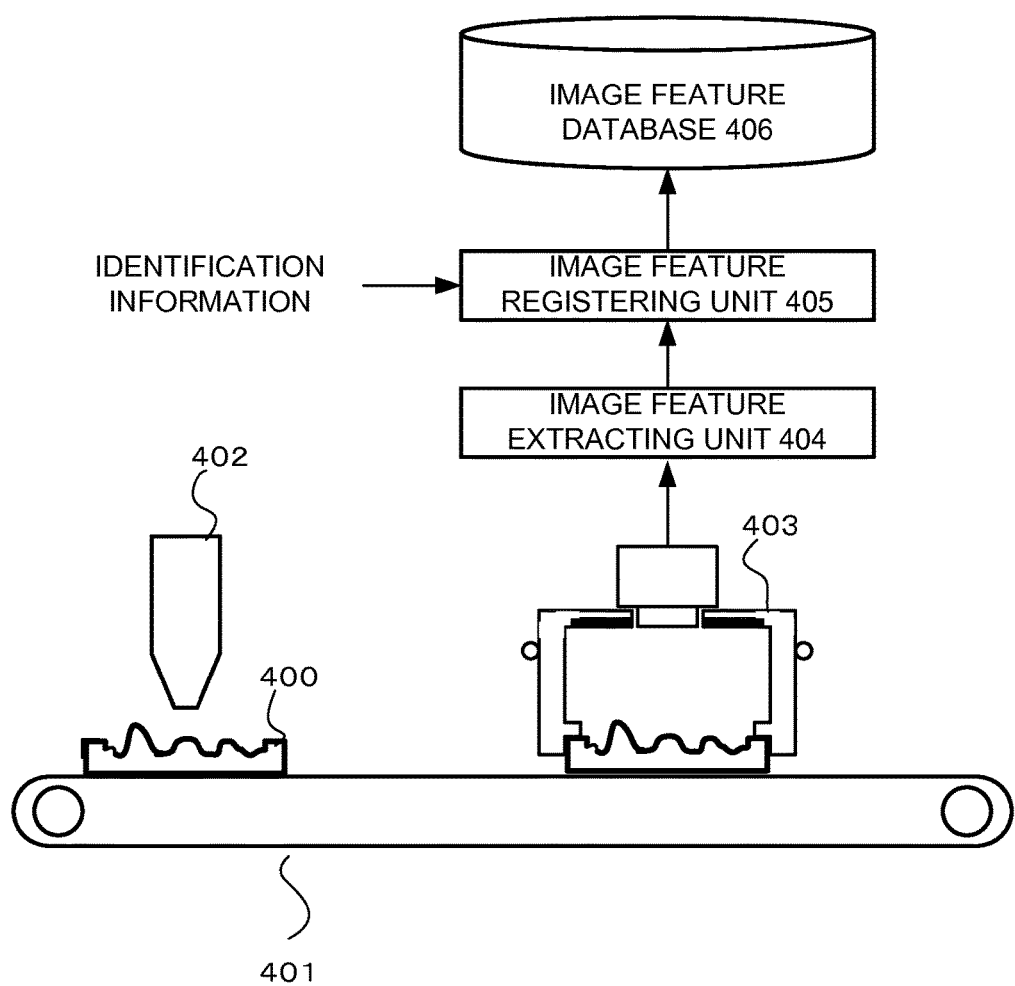
FIG. 13 is a block diagram of a fifth embodiment.

FIG. 13 is a block diagram of the registering apparatus in the fifth embodiment.

The registering apparatus in the fifth embodiment comprises: a belt conveyor 401 for carrying a component 400; a textured pattern forming unit 402 for forming a textured pattern in the component 400; an imaging unit 403 for imaging the textured pattern in the matching area of the component 400 under predetermined imaging conditions; an image feature extracting unit 404 for extracting an image feature in the matching area from an image captured at the imaging unit 403; and an image feature registering unit 405 for registering the extracted image feature in correspondence with identification of the component into an image feature database 406.

The textured pattern forming unit 402 is for applying textured finish generating microscopic random bumps and dips to at least a part of a skeleton part of an identification mark attached to a component, and forming a textured pattern for matching. Representative examples of textured finish include sand blasting, etching-based surface processing, and blasting coating, although other methods may apply. Moreover, while it is preferable to apply textured finish precisely to a matching area in the skeleton part of the identification mark, the textured pattern may be formed at least within the matching area because some offset or the like may be handled in later image processing.

The imaging unit 403 images the matching area in the component 400 formed with a textured pattern and carried by the belt conveyor 401 by the method as in the imaging conditions described regarding the first embodiment above, and outputs a captured image to the image feature extracting unit 404.

The image feature extracting unit 404 is for extracting an image feature of the textured pattern in the matching area from the image captured at the imaging unit 403. The extraction of the image feature is achieved using an extraction technique for image features of fingerprints, such as the brightness value of the image, feature points, and points of inflection, intersecting points, end points and center points of lines in a binarized image. When needed, the extraction of the image feature is performed after normalization using the skeleton part of the identification mark, as described earlier.

The image feature registering unit 405 registers the image feature of the component 400 extracted by the image feature extracting unit 404 in correspondence with the identification information for the component 400 into the image database 406.

According to such a registration apparatus, the process beginning from textured finish for identification down to registration of an image feature may be automatically performed.

It should be noted that the registration apparatus may be present merely for registration of image features without having the textured pattern forming unit 402.

The several embodiments have been described, and as is obvious from the preceding description, while the image feature extracting unit, identification unit, and the like may be configured in hardware, they also may be implemented by a computer program. In this case, a processor that is operated by programs stored in a program memory implements functions and/or operations similar to those in the embodiments described above.

Moreover, part or all of the preceding embodiments may be described as in the following appendices, although not limited thereto.

(Supplementary Note 1) An identification method comprising:

with at least a part of a skeleton part of an identification mark attached to a component or a product defined as a matching area, identifying said component, said product, or a product having said component as one of its constituent elements using a textured pattern formed in said matching area.

(Supplementary Note 2) The identification method according to supplementary note 1, comprising:

with at least a part of a skeleton part of an identification mark attached to a component or a product defined as a matching area, storing beforehand an image feature of a textured pattern formed in said matching area;

acquiring an image feature of a textured pattern formed in a matching area in a skeleton part of an identification mark attached to a component or a product to be identified, or in a skeleton part of a component that is one of constituent elements of a product to be identified; and matching said acquired image feature with said stored image feature, and identifying said component, product, or product having said component as one of its constituent elements to be identified.

(Supplementary Note 3) The identification method according to supplementary note 1 or 2, comprising:

normalizing a captured image of said textured pattern formed in said matching area using a skeleton part of said identification mark, and acquiring an image feature of said textured pattern formed in said matching area.

(Supplementary Note 4) The identification method according to any one of supplementary notes 1 to 3, wherein:

said stored image feature is an image feature of an image obtained by imaging a textured pattern formed in a matching area in a skeleton part of an identification mark attached to said component or product under predetermined illumination conditions, and said image feature of a textured pattern formed in a matching area in a skeleton part of an identification mark attached to said component or product to be identified, or in a skeleton part of said component that is one of constituent elements of said product to be identified is an image feature acquired by imaging said textured pattern formed in a matching area in a skeleton part of an identification mark attached to said component or product to be identified, or in a skeleton part of said component that is one of constituent elements of said product to be identified under illumination conditions similar to said predetermined illumination conditions.

(Supplementary Note 5) The identification method according to any one of supplementary notes 1 to 4, wherein:

said textured pattern is one formed by a mold, and said method comprises:

storing, for each mold, an image feature of a textured pattern formed in a matching area in a skeleton part of an identification mark attached to at least one component or product out of a plurality of components or products formed with a textured pattern in a matching area in a skeleton part of said identification mark by the same mold; and performing identification of said component, product, or product having said component as one of its constituent elements to be identified on a mold-by-mold basis.

(Supplementary Note 6) The identification method according to supplementary note 5, wherein:

said image feature for each mold is an image feature of an image capturing a texture of a mold with its brightness value reversed, and said method matches said image feature having a reversed brightness value with said image feature of a textured pattern formed in a matching area in a skeleton part of an identification mark attached to said component or product to be identified, or in a skeleton part of said component that is one of constituent elements of said product to be identified.

(Supplementary Note 7) The identification method according to any one of supplementary notes 1 to 4, comprising:

storing beforehand an image feature of a textured pattern formed in a matching area in a skeleton part of an identification mark attached to a component or a product for each individual object of said component or said product; and performing identification of said component, product, or product having said component as one of its constituent elements to be identified for each individual object of said component or said product.

(Supplementary Note 8) The identification method according to any one of supplementary notes 5 to 7, comprising:

storing said image feature of a textured pattern formed in a matching area in a skeleton part of an identification mark attached to said component or product in correspondence with management information for said component, product, or product having said component as one of its constituent elements.

(Supplementary Note 9) The identification method according to any one of supplementary notes 1 to 8, comprising:

applying textured finish generating microscopic random bumps and dips in a matching area in a skeleton part of said identification mark and forming a textured pattern for matching during a manufacturing process for said component or product.

(Supplementary Note 10) The identification method according to supplementary note 9, wherein:

said textured finish is sand blasting, etching-based surface processing, or blasting coating.

(Supplementary Note 11) An identification system comprising:

an image feature storage unit in which, with at least a part of a skeleton part of an identification mark attached to a component or a product defined as a matching area, an image feature of a textured pattern formed in said matching area is stored; and an identification unit configured to match an image feature of a textured pattern formed in a matching area in a skeleton part of an identification mark attached to a component or a product to be identified, or in a skeleton part of a component that is one of constituent elements of a product to be identified, with an image feature stored in said image feature storage unit, and identify said component, product, or product having said component as one of its constituent elements to be identified.

(Supplementary Note 12) The identification system according to supplementary note 11, wherein:

said identification unit normalizes a captured image of said textured pattern formed in said matching area using a skeleton part of said identification mark, and acquires an image feature of said textured pattern formed in said matching area.

(Supplementary Note 13) The identification system according to supplementary note 11 or 12, comprising:

an image capturing unit configured to image a textured pattern formed in a matching area in a skeleton part of an identification mark attached to said component or product under predetermined illumination conditions; and an identification image capturing unit configured to capture an image feature of a textured pattern formed in a matching area in a skeleton part of an identification mark attached to said component or product to be identified, or in a skeleton part of said component that is one of constituent elements of said product to be identified under illumination conditions similar to said predetermined illumination conditions.

(Supplementary Note 14) The identification system according to any one of supplementary notes 11 to 13, wherein:

said textured pattern is one formed by a mold, said image feature storage unit stores therein, for each mold, an image feature of a textured pattern formed in a matching area in a skeleton part of an identification mark attached to at least one component or product out of a plurality of components or products formed with a textured pattern in a matching area in a skeleton part of said identification mark by the same mold, and said identification unit performs identification of said component, product, or product having said component as one of its constituent elements to be identified on a mold-by-mold basis.

(Supplementary Note 15) The identification system according to supplementary note 14, wherein:

said image feature for each mold is an image feature of an image capturing a texture of a mold with its brightness value reversed, and said identification unit matches said image feature having a reversed brightness value with said image feature of a textured pattern formed in a matching area in a skeleton part of an identification mark attached to said component or product to be identified, or in a skeleton part of said component that is one of constituent elements of said product to be identified.

(Supplementary Note 16) The identification system according to any one of supplementary notes 11 to 13, wherein:

said image feature storage unit stores therein an image feature of a textured pattern formed in a matching area in a skeleton part of an identification mark attached to a component or a product for each individual object of said component or said product, and said identification unit performs identification of said component, product, or product having said component as one of its constituent elements to be identified for each individual object of said component or said product.

(Supplementary Note 17) The identification system according to any one of supplementary notes 14 to 16, wherein:

an image feature of a textured pattern formed in a matching area in a skeleton part of an identification mark attached to said component or product is stored in correspondence with management information for said component, product, or product having said component as one of its constituent elements in said image feature storage unit.

(Supplementary Note 18) A matching apparatus comprising:

an acquisition unit configured to, with at least a part of a skeleton part of an identification mark attached to a component or a product defined as a matching area, acquire a first image of a textured pattern formed in said matching area, and a second image of a textured pattern formed in a matching area in a skeleton part of an identification mark attached to a component or a product to be identified, or in a skeleton part of a component that is one of constituent elements of a product to be identified; and an output unit configured to match said first image with said second image, and output a result of matching.

(Supplementary Note 19) The matching apparatus according to supplementary note 18, wherein:

said output unit normalizes said first image or said second image using a skeleton part of said identification mark.

(Supplementary Note 20) The matching apparatus according to supplementary note 18 or 19, wherein:

said first image and said second image are images obtained by performing imaging under similar predetermined illumination conditions.

(Supplementary Note 21) The matching apparatus according to any one of supplementary notes 18 to 20, wherein:

said textured pattern is one formed by a mold, said first image is an image of a textured pattern formed in a matching area in a skeleton part of an identification mark attached to at least one component or product out of a plurality of components or products formed with a textured pattern in a matching area in a skeleton part of said identification mark by the same mold, and said output unit performs matching between said first image and said second image on a mold-by-mold basis.

(Supplementary Note 22) The matching apparatus according to supplementary note 22, wherein:

said first image is an image capturing a texture of a mold with its brightness value reversed.

(Supplementary Note 23) The matching apparatus according to any one of supplementary notes 18 to 20, wherein:

said first image is an image of a textured pattern formed in a matching area in a skeleton part of an identification mark attached to a component or a product for each individual object, and said output unit performs matching between said first image and said second image on an individual object-by-individual object basis.

(Supplementary Note 24) The matching apparatus according to any one of supplementary notes 18 to 23, wherein:

textured finish generating microscopic random bumps and dips is applied in a matching area in a skeleton part of said identification mark, and forming a textured pattern for matching during a manufacturing process for said component or product.

(Supplementary Note 25) The matching apparatus according to supplementary note 24, wherein:

said textured finish is sand blasting, etching-based surface processing, or blasting coating.

(Supplementary Note 26) A registration apparatus comprising:

a textured pattern forming unit configured to apply textured finish generating microscopic random bumps and dips to at least a part of a skeleton part of an identification mark attached to a component or a product, and form a textured pattern for matching;

an imaging unit configured to, with at least a part of a skeleton part formed with a textured pattern defined as a matching area, image a textured pattern in a matching area in a skeleton part of said component or said product under predetermined imaging conditions; and a registration unit configured to register in a storage unit identification information for identifying said component or said product in correspondence with an image feature of said imaged textured pattern in a matching area.

(Supplementary Note 27) The registration apparatus according to supplementary note 26, comprising:

a textured pattern forming unit configured to apply textured finish generating microscopic random bumps and dips to at least a part of a skeleton part of an identification mark attached to a component or a product, and form a textured pattern for matching.

(Supplementary Note 28) The registration apparatus according to supplementary note 26 or 27, wherein:

said registration unit registers in said storage unit an image feature of said imaged textured pattern in a matching area in correspondence with management information for said component, product, or product having said component as one of its constituent elements.

(Supplementary Note 29) A program for causing a computer to execute:

acquisition processing of, with at least a part of a skeleton part of an identification mark attached to a component or a product defined as a matching area, acquisition a first image of a textured pattern formed in said matching area, and a second image of a textured pattern formed in a matching area in a skeleton part of an identification mark attached to a component or a product to be identified, or in a skeleton part of a component that is one of constituent elements of a product to be identified; and matching processing of matching said first image with said second image, and outputting a result of matching.

(Supplementary Note 30) The program according to supplementary note 29, comprising:

processing of normalizing said first image or said second image using a skeleton part of said identification mark.

(Supplementary Note 31) The program according to supplementary note 29 or 30, wherein:

said first image and said second image are images obtained by performing imaging under similar predetermined illumination conditions.

(Supplementary Note 32) The program according to any one of supplementary notes 29 to 31, wherein:

said textured pattern is one formed by a mold, said first image is an image of a textured pattern formed in a matching area in a skeleton part of an identification mark attached to at least one component or product out of a plurality of components or products formed with a textured pattern in a matching area in a skeleton part of said identification mark by the same mold, and said matching processing performs matching between said first image and said second image on a mold-by-mold basis.

(Supplementary Note 33) The program according to any one of supplementary notes 29 to 32, wherein:

said first image is an image capturing a texture of a mold with its brightness value reversed.

(Supplementary Note 34) The program according to any one of supplementary notes 29 to 33, wherein:

said first image is an image of a textured pattern formed in a matching area in a skeleton part of an identification mark attached to a component or a product for each individual object, and said matching processing performs matching between said first image and said second image on an individual object-by-individual object basis.

(Supplementary Note 35) The program according to any one of supplementary notes 29 to 34, wherein:

textured finish generating microscopic random bumps and dips is applied in a matching area in a skeleton part of said identification mark, and forming a textured pattern for matching during a manufacturing process for said component or product.

(Supplementary Note 36) The program according to supplementary note 35, wherein:

said textured finish is sand blasting, etching-based surface processing, or blasting coating.

(Supplementary Note 37) A component or a product formed with a textured pattern for matching for identifying said component or product in at least a part of a skeleton part of an identification mark.

While the present invention has been described with reference to the preferred embodiments, it is not necessarily limited to the embodiments described above, and may be practiced with several modifications within the scope of the technical idea thereof.

The present application claims priority based on Japanese Patent Application No. 2013-49282 filed on Mar. 12, 2013, disclosure of which is incorporated herein in its entirety.

REFERENCE SIGNS LIST

1 Identification mark
1a, 1b Skeleton part
2 Logo plate
3 Bag
4 Matching area
10 Image feature storage unit
11 Identification unit
20 Light source unit
21 Cover unit
100 Bag
101 Imaging unit
102 Image feature extracting unit
103 Image feature database
104 Imaging unit
105 Image feature extracting unit
106 Matching unit
107 Bag
110 Logo plate
111 Logo plate
200 Bag
201 Imaging unit
202 Image feature extracting unit
203 Image feature database
204 Imaging unit
205 Image feature extracting unit
206 Matching unit
207 Bag
210 Logo plate
211 Logo plate
300 Bag
301 Imaging unit
302 Image feature extracting unit
303 Image feature database
304 Imaging unit 305 Image feature extracting unit
306 Matching unit
307 Bag
310 Logo plate
311 Logo plate
400 Component
401 Belt conveyor
402 Textured pattern forming unit
403 Imaging unit
404 Image feature extracting unit
405 Image feature registering unit
406 Image feature database

What is claimed is:

1. An identification method comprising, executing on a computer:
   with at least a part of a skeleton part of an identification mark attached to a component or a product defined as a matching area, storing beforehand an image feature of a textured pattern formed by a mold, in said matching area of the skeleton part, into a memory, the skeleton part being a common shape and size among the component or the product and being defined as a reference;
   acquiring an image feature of a textured pattern formed by a mold in a matching area in a skeleton part of an identification mark attached to a component or a product to be identified, or in a skeleton part of a component that is one of constituent elements of a product to be identified;
   normalizing position and posture of the acquired image using the skeleton part and acquiring an image feature of the textured pattern formed in the matching area; and
   matching said acquired image feature with the image feature stored on the memory, and identifying said component, product, or product having said component as one of its constituent elements to be identified
   wherein random pattern composed of bumps and dips for matching is applied to the mold, and the textured pattern in the matching area is formed by transcribing the random pattern composed of bumps and dips for matching applied to the mold.

2. The identification method according to claim 1, wherein:
   said stored image feature is the image feature of an image obtained by imaging the textured pattern formed in the matching area in a skeleton part of the identification mark attached to said component or product under predetermined illumination conditions, and
   said image of the textured pattern formed in the matching area in the skeleton part of the identification mark attached to said component or product to be identified, or in a skeleton part of said component that is one of constituent elements of said product to be identified is the image acquired by imaging said textured pattern formed in the matching area in the skeleton part of an identification mark attached to said component or product to be identified, or in the skeleton part of said component that is one of constituent elements of said product to be identified under illumination conditions similar to said predetermined illumination conditions.

3. The identification method according to claim 1, further comprising:
   storing, for each mold, the image feature of the textured pattern formed in the matching area in the skeleton part of the identification mark attached to at least one component or product out of a plurality of components or products formed with the textured pattern in the matching area in the skeleton part of said identification mark by the same mold; and
   performing identification of said component, product, or product having said component as one of its constituent elements to be identified on a mold-by-mold basis.

4. The identification method according to claim 3, wherein:
   said image feature for each mold is an image feature of an image capturing a texture of a mold with its brightness value reversed, and
   said method matches said image feature having a reversed brightness value with said image feature of the textured pattern formed in the matching area in the skeleton part of the identification mark attached to said component or product to be identified, or in the skeleton part of said component that is one of constituent elements of said product to be identified.

5. The identification method according to claim 1, further comprising:
   storing beforehand the image feature of the textured pattern formed in the matching area in the skeleton part of the identification mark attached to the component or the product for each individual object of said component or said product; and
   performing identification of said component, product, or product having said component as one of its constituent elements to be identified for each individual object of said component or said product.

6. The identification method according to claim 3, further comprising:
   storing said image feature of the textured pattern formed in the matching area in the skeleton part of the identification mark attached to said component or product in correspondence with management information for said component, product, or product having said component as one of its constituent elements.

7. The identification method according to claim 1, further comprising:
   applying textured finish generating microscopic random bumps and dips in the matching area in the skeleton part of said identification mark and forming the textured pattern for matching during a manufacturing process for said component or product.

8. The identification method according to claim 7, wherein:
   said textured finish is sand blasting, etching-based surface processing, or blasting coating.

9. An identification system comprising:
   an image feature storage unit in which, with at least a part of a skeleton part of an identification mark attached to a component or a product defined as a matching area, an image feature of a textured pattern formed by a mold in said matching area is stored, the skeleton part being a common shape and size among the component or the product and being defined as a reference and at least one processor;
   wherein the processor is configured to implement an identification unit configured to
   acquire an image of a textured pattern formed by a mold in a matching area in a skeleton part of an identification mark attached to a component or a product to be identified, or in a skeleton part of a component that is one of constituent elements of a product to be identified,
   normalize position and posture of the acquired image using the skeleton part and acquire an image feature of the textured pattern formed in the matching area, and match the acquired image feature with the image feature stored in said image feature storage unit, and identify said component, product, or product having said component as one of its constituent elements to be identified, wherein random pattern composed of bumps and dips for matching is applied to the mold, and the textured pattern in the matching area is formed by transcribing the random pattern composed of bumps and dips for matching applied to the mold.

10. The identification system according to claim 9, further comprising:

an image capturing unit configured to image the textured pattern formed in the matching area in a skeleton part of the identification mark attached to said component or product under predetermined illumination conditions; and an identification image capturing unit configured to capture the image feature of the textured pattern formed in the matching area in a skeleton part of the identification mark attached to said component or product to be identified, or in the skeleton part of said component that is one of constituent elements of said product to be identified under illumination conditions similar to said predetermined illumination conditions.

11. The identification system according to claim 9, wherein:

said image feature storage unit stores therein, for each mold, the image feature of the textured pattern formed in the matching area in the skeleton part of the identification mark attached to at least one component or product out of a plurality of components or products formed with the textured pattern in the matching area in a skeleton part of said identification mark by the same mold, and said identification unit performs identification of said component, product, or product having said component as one of its constituent elements to be identified on a mold-by-mold basis.

12. The identification system according to claim 11, wherein:

said image feature for each mold is the image feature of an image capturing a texture of a mold with its brightness value reversed, and said identification unit matches said image feature having a reversed brightness value with said image feature of the textured pattern formed in the matching area in the skeleton part of an identification mark attached to said component or product to be identified, or in a skeleton part of said component that is one of constituent elements of said product to be identified.

13. The identification system according to claim 9, wherein:

said image feature storage unit stores therein the image feature of a textured pattern formed in the matching area in the skeleton part of the identification mark attached to the component or the product for each individual object of said component or said product, and said identification unit performs identification of said component, product, or product having said component as one of its constituent elements to be identified for each individual object of said component or said product.

14. The identification system according to claim 11, wherein:

the image feature of the textured pattern formed in the matching area in the skeleton part of the identification mark attached to said component or product is stored in correspondence with management information for said component, product, or product having said component as one of its constituent elements in said image feature storage unit.

15. A matching apparatus comprising:

at least one processor and a memory coupled to the at least one processor;

wherein the processor is configured to implement:

an acquisition unit configured to, with at least a part or a skeleton part of an identification mark attached to a component or a product defined as a matching area, the skeleton part of being a common shape and size among the component or the product and being defined as a reference, acquire a first image of a textured pattern formed by a mold in said matching area, and a second image of a textured pattern formed by a mold in a matching area in a skeleton part of an identification mark attached to a component or a product to be identified, or in a skeleton part of a component that is one of constituent elements of a product to be identified, normalize position and posture of the first image or the second image using the skeleton part, and an output unit configured to match said first image with said second image, and output a result of matching, wherein random pattern composed of bumps and dips for matching is applied to the mold, and the textured pattern in the matching area is formed by transcribing the random pattern composed of bumps and dips for matching applied to the mold.

16. A registration apparatus comprising:

an imaging unit configured to, with at least a part of a skeleton part formed with a textured pattern defined as a matching area, image a textured pattern formed by a mold in a matching area in a skeleton part of said component or said product under predetermined imaging conditions, the skeleton part being a common shape and size among the component or the product and being defined as a reference, and at least one processor;

wherein the processor is configured to implement a registration unit configured to normalize the imaged textured pattern using the skeleton part and register in a storage unit identification information for identifying said component or said product in correspondence with an image feature of said imaged textured pattern in a matching area;

wherein random pattern composed of bumps and dips for matching is applied to the mold, and the textured pattern in the matching area is formed by transcribing the random pattern composed of bumps and dips for matching the mold.

17. The registration apparatus according to claim 16, wherein the processor is configured to implement a textured pattern forming unit configured to apply textured finish generating microscopic random bumps and dips to at least a part of a skeleton part of an identification mark attached to a component or a product, and form a textured pattern for matching.

18. The registration apparatus according to claim 16, wherein:

said registration twit registers in said storage unit an image feature of said imaged textured pattern in the matching area in correspondence with management information for said component, product, or product having said component as one of its constituent elements.

19. A non-transitory computer readable storage medium storing program for causing a computer to execute:

acquisition processing of, with at least a part of a skeleton part of an identification mark attached to a component or a product defined as a matching area, the skeleton part being a common shape and size among the component or the product and being defined as a reference, acquiring a first image of a textured pattern formed by a mold in said matching area, and a second image of a textured pattern formed by a mold in a matching area in a skeleton part of an identification mark attached to a component or a product to be identified, or in a skeleton part of a component that is one of constituent elements of a product to be identified, normalizing the first image or the second image using the skeleton part and matching processing of matching said first image with said second image, and outputting a result of matching;

wherein random pattern composed of bumps and is applied to the mold, and the textured pattern in the matching area is formed by transcribing the random pattern composed of bumps and dips the mold.

\* \* \* \* \*